United States Patent [19]

Husby et al.

[11] Patent Number: 5,153,392
[45] Date of Patent: Oct. 6, 1992

[54] VELOCITY CHANGE SENSOR WITH MAGNETIC FIELD CONCENTRATOR AND DIRECTOR

[75] Inventors: Harald S. Husby, Budd Lake; Allen K. Breed, Boonton Township, Morris County; Ted Thuen, Morris Plains, all of N.J.

[73] Assignee: Breed Automotive Technology, Inc., Boonton Township, Morris County, N.J.

[21] Appl. No.: 668,361

[22] Filed: Mar. 12, 1991

Related U.S. Application Data

[63] Continuation of Ser. No. 418,147, Oct. 6, 1989, abandoned.

[51] Int. Cl.⁵ .................... H01H 35/14; G01P 15/08; B60R 21/08
[52] U.S. Cl. ................ 200/61.45 M; 200/61.53; 280/735
[58] Field of Search .......... 200/61.45 R, 61.53; 335/205; 280/734, 735

[56] References Cited

U.S. PATENT DOCUMENTS

| | | | |
|---|---|---|---|
| 3,557,628 | 1/1971 | Tsukada | 73/516 |
| 3,737,599 | 6/1973 | Zuvela | 200/61.45 R |
| 4,009,460 | 2/1977 | Fukui et al. | 336/110 |
| 4,116,132 | 9/1978 | Bell | 200/61.53 X |
| 4,117,401 | 9/1978 | Glauert | 324/208 |
| 4,221,940 | 9/1980 | Roth | 200/61.48 X |
| 4,262,177 | 4/1981 | Paxton et al. | 200/61.48 X |
| 4,329,549 | 5/1982 | Breed | 200/61.53 X |
| 4,827,091 | 5/1989 | Behr | 200/61.53 X |
| 4,873,401 | 10/1989 | Ireland | 200/61.53 X |
| 5,003,259 | 3/1991 | Palazzetti et al. | 324/207.14 |

FOREIGN PATENT DOCUMENTS

| | | |
|---|---|---|
| 0288759 | 3/1988 | European Pat. Off. |
| 0293784 | 12/1988 | European Pat. Off. |
| 2620134 | 11/1977 | Fed. Rep. of Germany |
| 3115630 | 4/1982 | Fed. Rep. of Germany |

*Primary Examiner*—J. R. Scott
*Attorney, Agent, or Firm*—Kane, Dalsimer, Sullivan, Kurucz, Levy, Eisele and Richard

[57] ABSTRACT

An accelerometer for sensing velocity changes particularly suited for passenger restraint systems in a motor vehicle for the deployment of an air bag includes a housing with a magnetic closing element. The magnetic closing element includes a permanent magnet which generates a field around the sensor housing. A restricting element is mounted around the magnet for restricting and concentrating the magnetic field around the sensor. In an alternate embodiment, two similar sensors may be housed in a single enclosure for additional sensitivity. The restrictive elements of the sensors eliminate interference between the sensor magnetic fields.

10 Claims, 2 Drawing Sheets

VELOCITY CHANGE SENSOR WITH MAGNETIC FIELD CONCENTRATOR AND DIRECTOR

This is a continuation of copending application Ser. No. 07/418,147 filed on Oct. 6, 1989, now abandoned.

BACKGROUND OF THE INVENTION

1. Field of the Invention

This invention pertains to a velocity change sensor or accelerometer used in motor vehicles for detecting sudden changes in velocity and for activating in response a passenger restraining device such as an air bag. More particularly, this device employs an element which is biased in a first position by a magnet and moves to a second position in response to a sudden deceleration to establish an electric contact. An element is provided for shaping and concentrating the magnetic field generated by the magnet.

2. Background of the Invention

Studies have been made which indicate that injuries in motor vehicle accidents, especially at high speeds, can be substantially reduced or eliminated by the use of passenger restraint systems. These systems include an inflatable balloon usually termed an air bag which normally is stored away in the instrument panel or the steering wheel. When the motor vehicle is subjected to a sudden deceleration, the air bag is inflated and is deployed automatically in a position which cushions the passengers, restrains their movement and prevents contact between them and the automobile interior such as the windshield, the steering wheel, the instrument panel and so on. Of course, a crucial element of all such systems is the velocity change sensor or accelerometer which initiates the inflation and deployment of the air bags. The motion of the motor vehicle must be carefully and precisely monitored so that the air bags can be deployed very fast, before the passengers suffer any substantial injury. A velocity change sensor is disclosed in U.S. Pat. No. 4,329,549 assigned to the same company as the present invention. This sensor comprises a tubular housing surrounding a magnetically permeable metallic shell, a metal ball and a magnet biasing the ball toward a first end of the shell. At the second end of the shell there are a pair of electrical contact blades. The sensor is positioned in the motor vehicle in an orientation such that when the motor vehicle experiences a deceleration which exceeds a preset level, the ball moves from the first toward the second end, making contact with the two blades. Because the blades and the ball are made of on electrically conducting material, when the ball contacts the blades, an electrical path is established between the two blades. This electrical path is used to initiate the deployment of the air bags. One problem with this type of device involves the field generated by the magnet. If the sensor is disposed in a metal enclosure, the sidewalls of the enclosure usually concentrate and shape the field so that it is bottled in a region close to the metal sleeve. However if an enclosure which has no effect on a magnetic field, such as one having a low magnetic permittivity, such as a non-metallic enclosure, the field generally diverges away from the housing. Therefore the intensity of the magnetic field at the sleeve is lower when the housing the sensor is disposed in a non-metallic enclosure than in a metallic enclosure. A lower magnetic field degrades the performance of the sensor. Furthermore, it has been found that very sensitive and discriminative acceleration sensor systems may be made by mounting two sensors in a common housing. However, if these sensors are two close together, the fields from the two magnets interfere and produce undesirable responses.

OBJECTIVES AND SUMMARY OF THE INVENTION.

In view of the above mentioned disadvantages of the prior art, it is an objective of the present invention to provide an accelerometer which performs reliably independently of the type of housing provided for mounting the sensor or any metal present in the vicinity of the sensor.

A further objective is to provide a restraint system with a velocity sensor with several magnetic elements in which interference between the fields of the elements is eliminated.

Other objectives and advantages of the invention shall become apparent from the following description. An accelerometer constructed in accordance with the invention includes a housing with contact blades and a contacting element which provides an electric path between the blades when a deceleration above a threshold level is sensed. Contact between the blades is established by a contacting member. Normally the contacting member is biased toward a first position away from said contact blades by a magnetic field generated by a magnet disposed outside the housing. When a deceleration occurs, the contacting element is urged toward a second position and closes an electrical path with said contact blades. Thereafter an electric signal is sent to a control unit which deploys the air bag within the motor vehicle. A magnetic field keeper element disposed around the magnet shapes and constrains the field to the vicinity of the housing, so that the magnetic field biasing the contacting element is maintained at a constant level independently of the enclosure for the housing and concentrates the field to enable the magnetic field force to return the contacting member to its first position upon cessation at a deceleration input. Furthermore, the keeper eliminates interference between the magnetic fields of adjacent sensors disposed in a common enclosure.

DETAILED DESCRIPTION OF THE INVENTION

Figure 1:
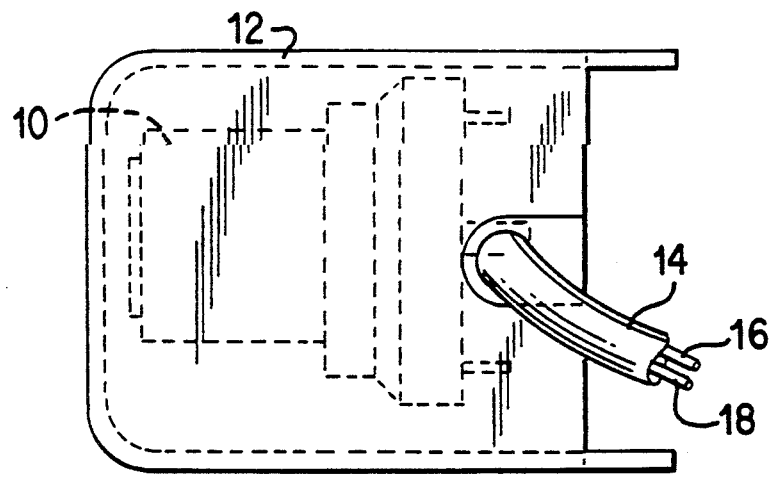
FIG. 1 shows a side elevation view of an accelerometer with a single sensor constructed in accordance with the invention disposed in an enclosure.

Turning now to the Figures, an accelerometer or velocity change sensor 10 constructed in accordance with this invention is usually disposed in a case 12 mounted on the motor vehicle (not shown). The sensor is connected by a cable 14 with at least two conductors 16, 18 to a control device for the deployment of the air bag.

The sensor 10 has a tubular body 20 terminating at one end with an end wall 22 with an external hollow extension 24. At end opposite wall 22, the body 20 has an enlarged crown 26 to form a seat for a rubber gasket 28. The body 20 is preferably made of a plastic material. The body 20 has an inner cylindrical wall 30. Secured to this wall 30 there is a metallic sleeve 32. End wall 22 is formed with a spherical depression 34 for holding metallic ball 36. The diameter of ball 36 is slightly smaller than the diameter of sleeve 32.

Figure 3:
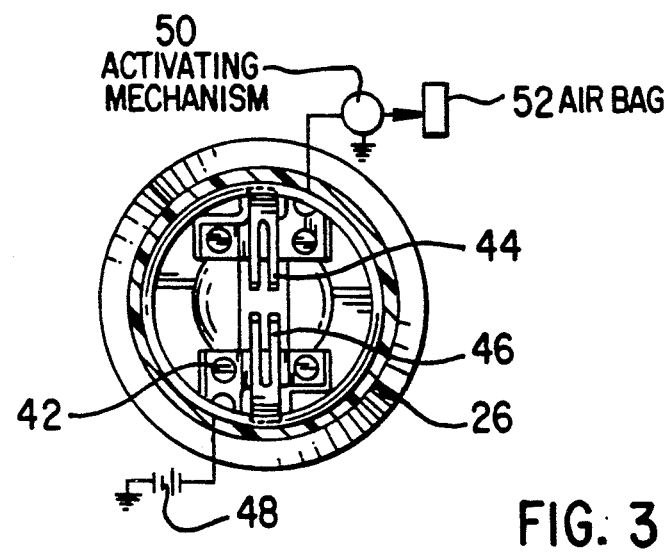
FIG. 3 shows a cross-sectional view of the accelerometer of FIG. 2 taken along line 3—3.

Crown 26 holds a plastic cap 38 having two metallic pins 40, 42, each supporting a corresponding contact blade 44, 46 respectively. As shown in FIG. 3, contact blades 44 and 46 are connected serially in an electrical circuit comprising a battery 48, and an actuating mechanism 50. Actuating device 50 controls and deploys one or more air bags 52.

Figure 4:
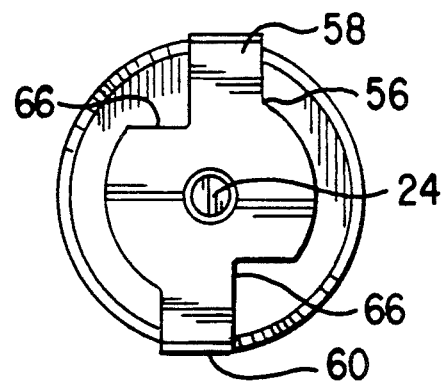
FIG. 4 shows side view of the accelerometer along lines 4—4 in FIG. 2.

A toroidal permanent magnet 54 is disposed on extension 24 as shown. The magnet generates a magnetic field which biases the ball 36 toward the end wall 22 in the position shown in FIG. 2. The shape of the magnetic field is controlled by a restrainer 56 comprising a U-shaped member made of a magnetic permeable material. The restrainer 56 includes two generally parallel arms 58, 60 extending from the magnet to a shoulder formed by crown 26. The restrainer also has a base 62 joining the two arms 58, 60. The restrainer base has a hole 64 for receiving the end of extension 24. In this manner the keeper 56 can be positioned adjacent permanent magnet 54 so that it limits its magnetic field in the axial direction. The two arms 58, 60 limit the magnetic field to the vicinity of the housing and increase its strength within the housing, at sleeve 32. As seen in FIG. 4, base 62 is provided with cut-outs 66 which facilitate the installation of the sensor within enclosure 12.

Figure 2:
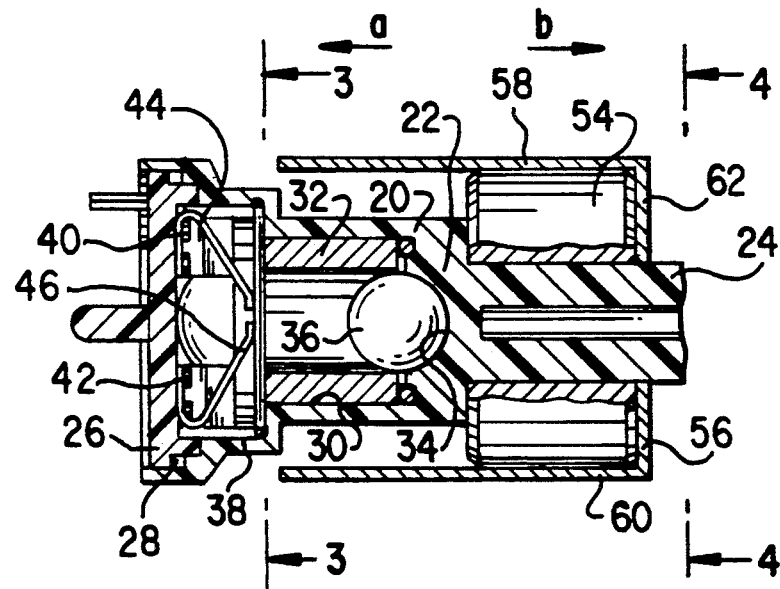
FIG. 2 shows a side cross-sectional view of the accelerometer of FIG. 1.

Housing 12 is oriented within the motor vehicle so that cap 38 is toward the front of the motor vehicle, while end wall 22 is disposed toward the rear of the vehicle. In FIG. 2 the normal direction of movement of the vehicle is indicated by arrow a. When the vehicle hits an object it is decelerated in direction b. If the force of deceleration is larger than the preset biasing force of the magnet 56, the ball 36 overcomes the force applied by the magnet 56, and moves in direction a toward cap 38 until it hits the contact blade 44,46. The ball then continues its movement in direction a until it is brought to a halt by the blades or the cap 38.

Meanwhile the contact between the ball 36 and blades 44, 46 allows current to flow from battery 48 to actuating device 50 which in response deploys air bag(s) 52. As previously mentioned, without the restrainer member or keeper 56, the intensity of the magnetic field generated by permanent magnet 54, and therefore the reaction time and movement of ball 36, would be dependent on the enclosure 12. However the restrainer constricts the field to the housing so that the enclosure 12 becomes immaterial.

Figure 5:
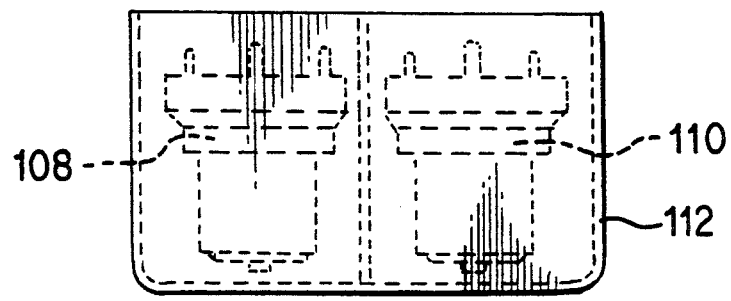
FIG. 5 shows a side elevation view of an accelerometer similar to FIG. 1 but having two sensors.

In a further embodiment of the invention, two sensors 108 and 110 having the structure shown in FIGS. 2-4 are mounted in a single housing 112 as shown in FIG. 5. The two sensors could have different sizes or different sized magnets to provide different responses. Alternatively, the sensors could be mounted in different relative orientations. This arrangement provides a very sensitive accelerometer which could differentiate between actual crashes, and apparent changes in velocity produced by road irregularities such as pot holes. Each of the sensors is provided with a keeper to limit the magnetic field of the corresponding magnets and eliminate magnetic interference therebetween.

Figure 6:
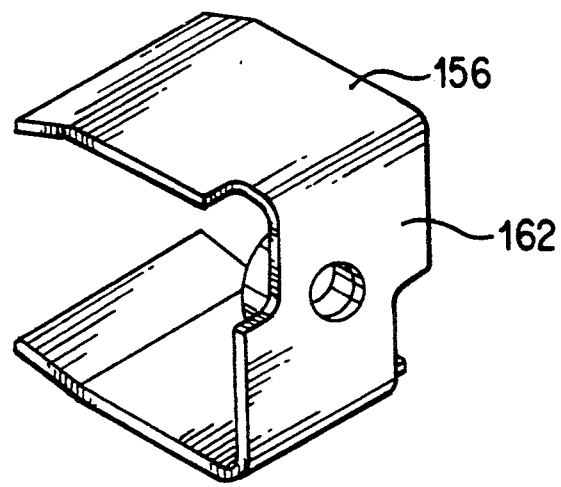
FIG. 6 shows another embodiment of the invention.

FIG. 6 shows a different restrainer 156 having an enlarged base 162.

Obviously numerous modifications may be made to the invention without departing from its scope as defined in the appended claims.

I claim:

1. An accelerometer sensor for sensing velocity changes comprising:
a housing;
contact means disposed in said housing;
a non-magnetized sensing element movably disposed in said housing; and
biasing means for generating a biasing force on said sensing element for urging said sensing element toward a first position, said sensing element being constructed and arranged to move along said path from said first to a second position in response to an acceleration greater than said biasing force for making contact with said biasing means, said biasing means including a permanent magnet disposed at one end of said housing adjacent to said first position and a magnetic field concentrating means disposed outside said housing and extending substantially over said permanent magnet and being substantially coextensive with said path, said magnetic field concentrating means being arranged and shaped for restricting and concentrating the magnetic field of said permanent magnet to said path.

2. The accelerometer of claim 1 wherein said contact means and said sensing element comprise an electrically conducting material for establishing an electric path when said sensing means contacts said contact means.

3. The accelerometer of claim 1 wherein said permanent magnet is disposed on said housing and said magnetic field concentrating means surrounds said permanent magnet.

4. The accelerometer of claim 1 wherein said magnetic field concentrating means is disposed adjacent to said permanent magnet.

5. A passenger restraint system for motor vehicles comprising:
an air bag disposed in a motor vehicle;
a control unit for selectively deploying said air bag in said motor vehicle for protecting a passenger in a crash; and
an accelerometer for sensing a velocity change of said motor vehicle coupled to said control unit and comprising:
a housing disposed in said motor vehicle, said housing defining a path;
contact blades disposed in said housing;
contact closing means arranged in said housing for making electrical contact with said contact blades when said motor vehicle decelerates at a level exceeding a threshold level; and
biasing means for biasing said contact closing means away from said contact blades along said path and including a permanent magnet coupled to said housing for generating a magnetic field and a magnetic field concentrating means for concentrating said field to said path, said magnetic field concentrating means being disposed outside said housing substantially co-extensively with said path.

6. The passenger restraint system of claim 5 wherein said housing includes a housing extension, and said permanent magnet is disposed on said extension.

7. The passenger restraint system of claim 6 wherein said magnetic field concentrating means is disposed on said housing extension adjacent said permanent magnet.

8. The passenger restraint system of claim 7 wherein said magnetic field concentrating means comprises a U-shaped member having a base and two parallel arms, said parallel arms extending along said housing.

9. The passenger restraint system of claim 8 wherein said U-shaped member is made of magnetically permeable material.

10. A passenger restraint system for a motor vehicle comprising:

an air bag disposed in a motor vehicle;

a control unit for selectively deploying said air bag in said motor vehicle for protecting a passenger in a crash; and an accelerometer for sensing a velocity change of said motor vehicle coupled to said control unit and comprising:

an enclosure disposed in said motor vehicle;

a first sensor disposed in said enclosure including first contact means, first contact closing means movable along a first path for selectively closing said first contact means in response to a change in velocity of said motor vehicle, a first magnetic generator for generating a first magnetic field and a first magnetic concentrating member for concentrating said first magnetic field to said first path, said first magnetic concentrating member being substantially coextensive with said first path; and a second sensor disposed in said enclosure including second contact means, second contact closing means movable along a second path for selectively closing said second contact means in response to a change in velocity of said motor vehicle, a second magnetic generator for generating a second magnetic field and a second magnetic concentrating member for concentrating said second magnetic field to said second path, said second magnetic concentrating member being substantially coextensive with said second path;

said first and second magnetic concentrating members cooperating to reduce interference between said first and second magnetic fields by concentrating said magnetic fields to the corresponding paths.

* * * * *